United States Patent [19]

Riley

[11] Patent Number: 4,965,560
[45] Date of Patent: Oct. 23, 1990

[54] MULTIPLE KEYBOARD SWITCH

[76] Inventor: Rupert A. Riley, 54 Molynes Road, Kingston 10, Jamaica

[21] Appl. No.: 272,630

[22] Filed: Nov. 17, 1988

[51] Int. Cl.[5] ............................................. G09G 5/00
[52] U.S. Cl. .................................... 340/717; 340/711
[58] Field of Search .................. 340/717, 711; 341/22, 341/26; 364/709.01, 709.09

[56] References Cited

U.S. PATENT DOCUMENTS

| 4,064,560 | 12/1977 | Baxter . | |
| 4,371,871 | 2/1983 | Adams | 340/717 |
| 4,651,299 | 3/1987 | Miyazaki et al. | 340/717 |

Primary Examiner—Jeffery A. Brier
Attorney, Agent, or Firm—Dressler, Goldsmith, Shore, Sutker & Milnamow, Ltd.

[57] ABSTRACT

A switch module for coupling a plurality of keyboards to an AT-type personal computer includes a plurality of inputs. An input is associated with each of the keyboards. The plurality of inputs is selectively switched to a set of output lines which are coupled to the keyboard input of the AT-type computer. A plurality of displays is provided, driven from a common display output of the AT-type computer. The switch module includes one or more electrically operable relays.

19 Claims, 2 Drawing Sheets

MULTIPLE KEYBOARD SWITCH

FIELD OF THE INVENTION

The invention pertains to multiple keyboard computer systems. More particularly, the invention pertains to an apparatus for electrically coupling a selected one of a plurality of keyboards to a computer.

BACKGROUND OF THE INVENTION

Personal computers have become very common in business and commercial organizations. Such computers usually include a processing unit, disk storage, display and a single keyboard. Other peripherals may be connected to the processing unit.

The processing unit usually includes a microprocessor. Several different types of microprocessors have been used. An INTEL type 80286 microprocessor has been used in the implementation of International Business Machines Model AT personal computer, as well as, AT-type imitations thereof. The 80286 processor has a 16 bit bidirectional data bus and a 24 bit unidirectional address bus. AT-type computers are discussed in *Using and Programming the IBM PC AT,* by T. Petersen; Prentice-Hall, 1987, incorporated herein by reference.

AT-type computers are usually used with an operating system such as PC-DOS or MS-DOS. AT-type computers have a multi-conductor single keyboard input. There are circumstances where it would be desirable to associate a plurality of keyboards with a given AT-type computer. In such an instance, it would be desirable to be able to select one keyboard from the plurality as the active one.

AT-type computers monitor one of the keyboard input lines. A loss of signal for an extended period of time requires that the operating system be rebooted or reinitialized. Such an operation can result in a loss of recently entered information and/or damage to records which are open at that time.

In addition, it would be desirable to be able to associate a display with each keyboard. Preferably, coupling the selected keyboard to the computer and driving the displays can be carried out in a cost effective fashion.

SUMMARY OF THE INVENTION

A manually operable apparatus is provided for coupling a selected member of a plurality of keyboards to an AT-type personal computer. In accordance with the invention, an electrical switch is mounted in a housing.

The switch can be implemented as a multi-pole, multi-position electrical relay. Electrical energy can be provided to switch the relay to a selected conducting state. The relay can be electrically connected between the keyboard input of the computer and the outputs of each member of the plurality of keyboards. Each state of the relay couples a selected one of the keyboards to the computer.

Further, in accordance with the invention, a display unit can be associated with each keyboard. The video displays are coupled in parallel and driven from the display output of the computer. The active keyboard will, as a result always have an associated display.

Systems that embody the present invention are especially advantageous in a multi-operator situation. In accordance with the invention, a record can be called up and displayed by a first keyboard. The switch can be activated and a second keyboard can be activated or coupled to the AT-type computer. Information can then be entered using the second keyboard. The selection switch can be actuated again and a third keyboard can be activated or coupled to the AT-type computer. The previously entered information can be used, expanded and/or modified at the third keyboard.

The displays associated with the inactive keyboards can still be used as they will each display the same information as the display associated with the active keyboard. Hence, they can be used to observe or supervise the display and entries of the active keyboard.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENT

Figure 1:
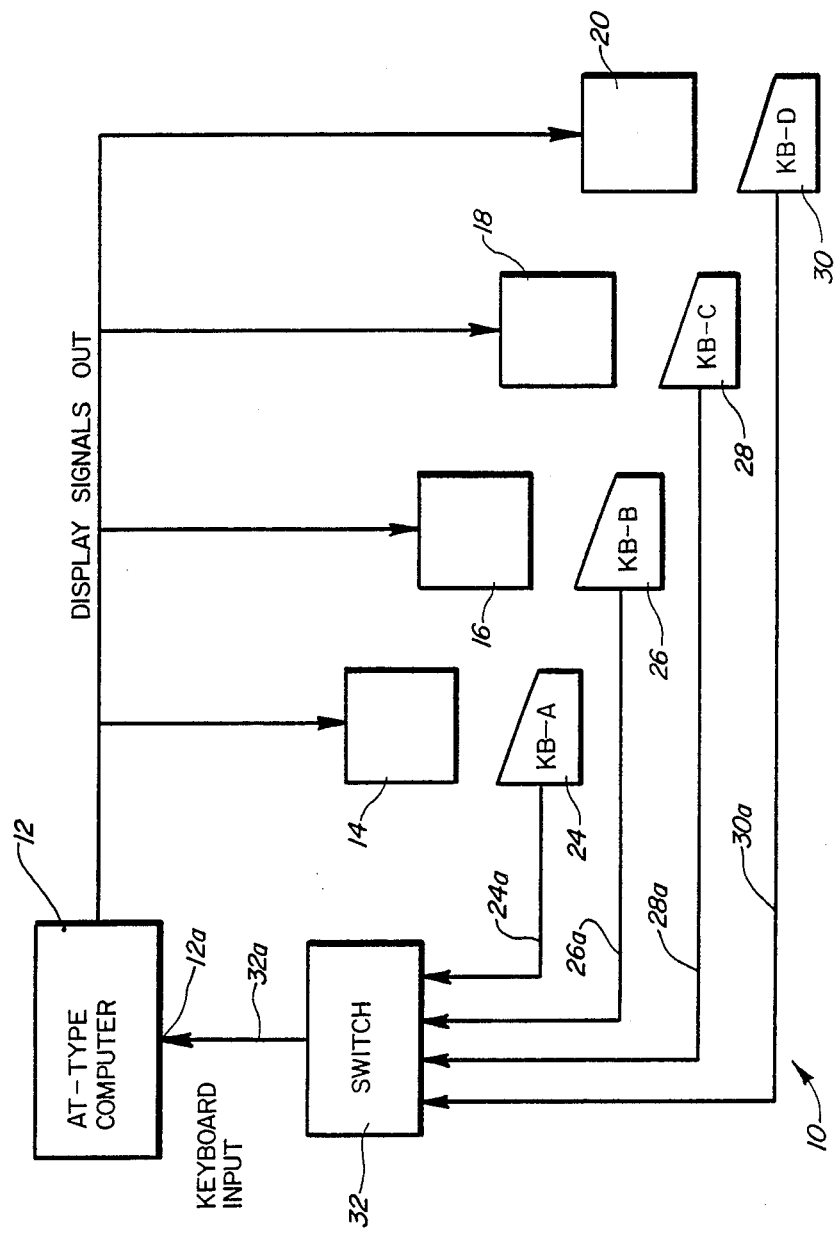
FIG. 1 is an overall block diagram of a system in accordance with the present invention.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

FIG. 1 illustrates a block diagram of a system 10 in accordance with the present invention. The system 10 includes an AT-type computer 12. The computer 12 includes an INTEL 80286 microcomputer. It will be understood that the AT-type computer 12 could be a product of International Business Machines Corporation, as well as, a product of numerous other manufacturers, a so-called clone.

The system 10 further includes a plurality of video displays having members 14-20. Each of the video displays 14-20 is driven in parallel from the video outport of the computer 12.

The system 10 also includes a plurality of keyboards 24-30. Each keyboard, such as the keyboard 24 is associated with a corresponding display, such as the display 14.

Each of the keyboards 24-30 generates electrical output signals on a corresponding set of lines 24a-30a which are coupled to a switch module 32. The switch module 32 is a manually selectable multi-position electrically activated switch which selects one set of inputs on the lines 24a-30a and on a plurality of lines 32a couples the selected input keyboard signals to the keyboard input of the computer 12.

It will be understood that while four keyboards are illustrated in the system 10 of FIG. 1, that the number of keyboards, the layout thereof and the keys on each are not a limitation of the present invention.

Depending on the setting of the switch 32, one of the keyboards, 24-30 may be selected for input purposes. Independently of whichever keyboard has been selected, the display units 14-20 all display the same image.

With the system 10, any one of the keyboards 24-30 can be used to input information. While the information is being input through the selected keyboard, the switch module 32 and the input lines 32a, each of the displays 14-20 will provide an accurate and identical representation thereof. Hence, the system 10 can be used with keyboards 24-30 in different offices with different individuals being able to enter data from different locations. Alternately, the system 10 can be used with all of the keyboards 24-30 in one room, perhaps for training purposes, with one person entering information and other individuals perhaps using displays 16-20 all simultaneously being able to observe the entry of the information.

Figure 2:
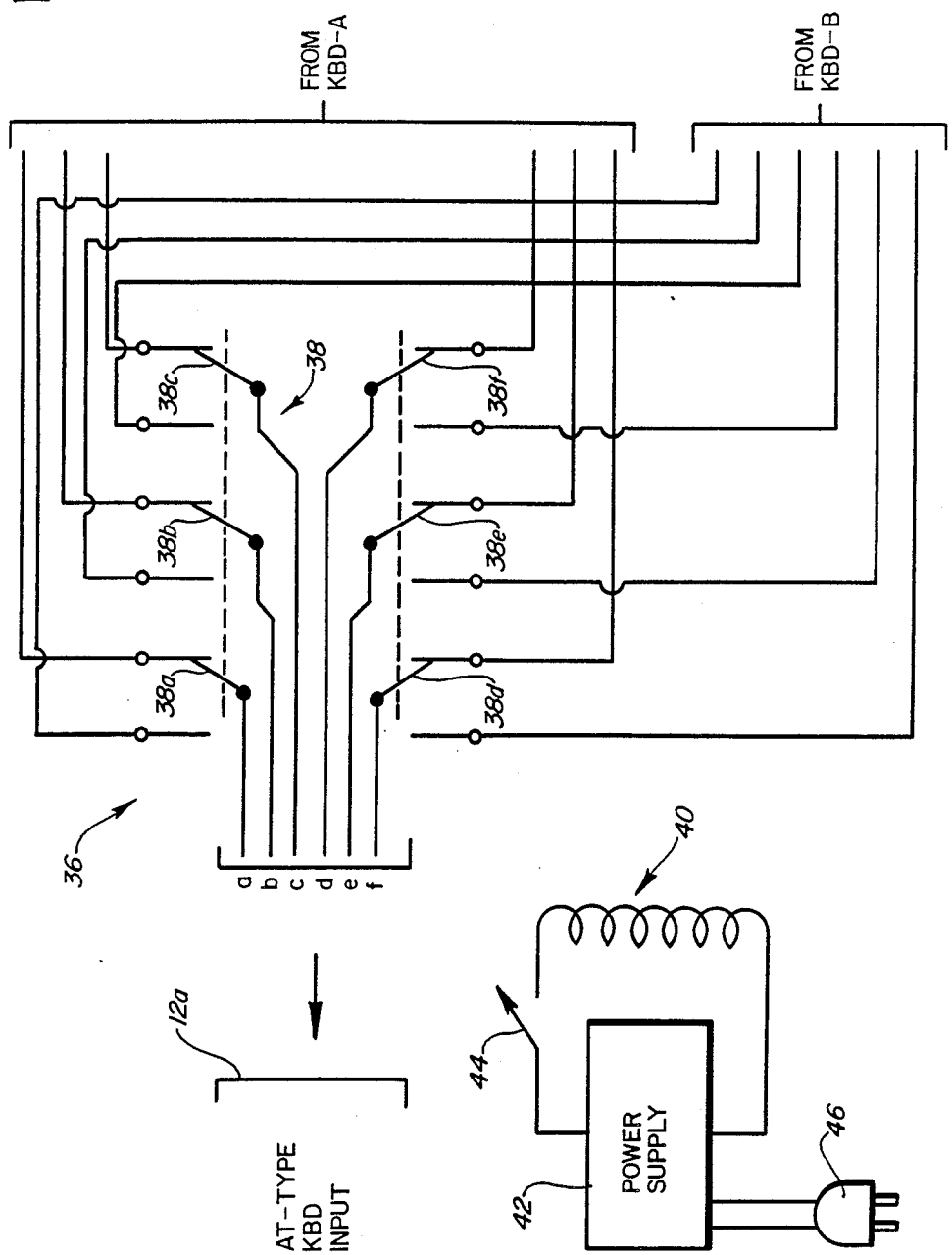
FIG. 2 is a schematic diagram of a switch module in accordance with the present invention.

FIG. 2 is a schematic diagram of a two-keyboard switch module 36. The switch module 36 includes a six pole double throw relay 38. The relay 38 includes a control coil 40.

The relay 38 is illustrated with each of its poles, 38a-38f in a position corresponding to the relay coil 40 not being energized. The relay coil 40 can be energized by means of a power supply 42 and a manually operable switch 44. The power supply 42 can be powered by means of plug 46 and a utility supplied source of electrical energy.

When the coil 40 is not energized, the contacts of the relay 38 are positioned as illustrated in FIG. 2 and keyboard A is coupled to the keyboard input of the computer 12. When the coil 40 is energized, in response to the closure of the switch 44, the contacts of the relay 38 assume their second position and inputs from the keyboard B are coupled to the keyboard inport of the computer 12.

It will be understood that different relays and switches could be used to couple four or more keyboards to the computer 12. For example, two or more relays 36 could be interconnected to couple 4 or more keyboards to the computer 12.

In one alternate system, a 6 pole double throw relay can be associated with each keyboard. The respective poles of all relays can be connected together to form the 6 input lines to the AT computer. Outputs from each keyboard can be connected to a respective contact of a respective relay.

A one-of-four selector circuit could be used to energize one relay coil at a time. The keyboard associated with the energized relay is thus electrically coupled to the input 12a of the AT-type computer. Alternately, a multi-position stepping relay could be used. The switch 44 can be replaced with a multi-position rotary switch.

With respect to FIG. 2, the keyboard input 12a is a six conductor connector. Conductors are allocated as follows:

| | |
|---|---|
| 1. Clock | 4. Ground |
| 2. Data | 5. 5 Volt D.C. |
| 3. Spare | 6. Neutral |

In the implementation of FIG. 2, all 6 conductors from each keyboard to the AT-type keyboard input 12a are switched. It has been determined that the present invention will function properly if only conductors 1, 2, 4 and 5 are switched. In this instance, a four pole relay would be sufficient.

The system 10 thus provides for sharing of the resources of the computer 12 among a variety of individuals. Only one of the keyboards 24-30 will be active at any one time. However, each of the displays 14-20 will be active and will simultaneously display the same information. If desired, of course, a corresponding display can be switched off if it is not being used.

One advantage of the system 10 is that information can be entered via keyboard and display 24, 14 and then by altering the setting of switch module 32 can be retrieved and altered at a different keyboard/display combination 28, 18. Hence, the system 10 makes it possible to share information among a variety of users very inexpensively and without any need or expense associated with networking.

Information can be entered in part at the keyboard 24. The switch 32 can be energized, or de-energized and the keyboard 26 activated. Additional information can then be entered at the keyboard 26. The AT-type computer 12 will not hang, shut down, need to be rebooted or in any way cease functioning normally when a system in accordance with the present invention is used to switch from one keyboard to another.

Hence, switching from one keyboard to another at the rates of speed made possible by electrically energized switches eliminates any need to reboot the AT-type computer system after a switch has taken place from one keyboard to another. As a result of using the present system there is no data lost as a result of switching from one keyboard to another.

The relay or relays used to switch from one keyboard to another are means for switching keyboards without losing data, or without needing to reboot or without having to reinitialize the operating system. Alternately, the relay or relays used to switch from one keyboard to another are means for switching keyboards while the AT-type computer functions normally as it would if no switching operation had taken place. Hence, the operation of switching from one keyboard to another takes place without in any way disrupting the normal functioning of the operating system.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A manually operable keyboard selectable multi-keyboard system usable by an operator to continuously enter data through a selected keyboard for an operator determined period of time comprising:
   central processing means having a 16 bit bidirectional data bus and a 24 bit address bus and usable with an operating system;
   a plurality of manually operable keyboards; and
   manually operable keyboard selecting means, coupled between each said keyboard and said processing means for switching only a selected one of said keyboards into electrical communication with said central processing means and for open circuiting all other keyboards with respect to said processing means for the operator determined period of time including means for eliminating any need to reboot said operating system in response to said keyboard switching whereby keyboard related electrical signals from only said single selected keyboard can be transmitted to said central processing means for the operator determined period of time.

2. A system as in claim 1 with said switching means including at least one multi-pole electrically operated relay.

3. A system as in claim 2 with said relay including an actuation coil, means for providing electrical energy to said coil and including manually operable switch means coupled between said coil and said providing means thereby to selectively apply electrical energy to said coil.

4. A system as in claim 3 with said providing means including a cable and associated means for engaging a supply of electrical energy.

5. A system as in claim 3 including control means, associated with said processing means for selectively sensing electrical signals communicated through said switching means from said selected one keyboard.

6. A system as in claim 1 with said switching means including a plurality of electrically activated relays and means for selectively energizing at least one relay coil thereby coupling a selected keyboard to said central processing means.

7. A system as in claim including a plurality of display means with each said display means associated with a respective one of said keyboards.

8. A system as in claim 7 including means for coupling said display means in parallel with one another whereby said display means are all capable of providing the same display independently of which of said keyboards has been selected.

9. A system as in claim 1 with said switching means including a multi-position manually operable switch.

10. A switching apparatus usable to couple only one member at a time of a plurality of manually operable keyboards to an INTEL type 80286 microcomputer for an operator determinable period of time comprising:
   manually selectable switch means, coupled between each said keyboard and the microcomputer for switching only a selected one of said keyboards into electrical communication with the microcomputer whereby electrical signals from only said single keyboard can be transmitted thereto for the operator determinable period of time while the microcomputer functions normally as if no switching operation had taken place; and
   means for supplying electrical energy to said switching means.

11. A system as in claim 10 with said switching means including at least one multi-pole electrically operated relay.

12. A system as in claim 11 with said relay including an actuation coil, means for providing electrical energy to said coil and including manually operable switch means coupled between said coil and said providing means thereby to selectively apply electrical energy to said coil.

13. A system as in claim 12 with said providing means including a cable and associated means for engaging a supply of electrical energy.

14. A system as in claim 10 including means for driving a plurality of displays with each member of said plurality associated with a respective keyboard.

15. A switching apparatus to couple, for an operator determinable period of time, an AT-type personal computer, usable with an operating system, to only one selected member at a time from a plurality of keyboards comprising:
   electrically actuated means for coupling only the single selected member of the plurality to the AT-type computer, for the operator determinable period of time, including means for switching from one keyboard to another without in any way disrupting the normal functioning of the operating system; and
   manually operable means, for controlling said coupling means.

16. An apparatus as in claim 15 with said coupling means including at least one relay.

17. An apparatus as in claim 15 with said controlling means including a multi-position, manually operable switch.

18. A multi-keyboard apparatus comprising:
   an AT-type computer usable with an operating system and having a keyboard input port;
   a plurality of keyboards;
   manually controllable keyboard selecting means for selectively coupling only one keyboard, from said plurality, at a time to said keyboard input port and for electrically disconnecting all other keyboards from said port including means for switching from one said keyboard to another while the operating system functions normally as if said switching had not taken place; and
   including a plurality of display means with each said display means associated with a respective one of said keyboards with means for coupling said display means in parallel with one another whereby said display means are all capable of providing the same display independently of which of said keyboards has been selected.

19. A keyboard selecting system comprising:
   an AT-type programmable digital processor including a keyboard input port for coupling a single keyboard thereto;
   a multi-position manually operable switch connected to said keyboard input port;
   a plurality of keyboards with each said keyboard connected to said switch with only one keyboard at a time electrically couplable to said input port via said switch and with all other keyboards open circuited with respect to said port; and
   including a plurality of display means with each said display means associated with a respective one of said keyboards and with means for coupling said display means in parallel with one another whereby said display means are all capable of providing the same display independently of which of said keyboards has been selected.

* * * * *

UNITED STATES PATENT AND TRADEMARK OFFICE
CERTIFICATE OF CORRECTION

PATENT NO. : 4,965,560

DATED : October 23, 1990

INVENTOR(S) : Rupert A. Riley

It is certified that error appears in the above-identified patent and that said Letters Patent is hereby corrected as shown below:

In claim 7, line 1 thereof, after the word "claim", the numeral --1-- should be inserted.

Signed and Sealed this

Seventeenth Day of March, 1992

Attest:

HARRY F. MANBECK, JR.

Attesting Officer

Commissioner of Patents and Trademarks